United States Statutory Invention Registration [19]

[11] Reg. Number: H853

Stewart [43] Published: Dec. 4, 1990

[54] SLITTED HYBRID COMPOSITE DESIGN FOR GUN LAUNCH APPLICATIONS

[75] Inventor: W. Brian Stewart, Lancaster, Pa.

[73] Assignee: The United States of America as represented by the Secretary of the Army, Washington, D.C.

[21] Appl. No.: 527,962

[22] Filed: May 21, 1990

[51] Int. Cl.[5] ..... F02F 7/00

[52] U.S. Cl. ..... 138/118.100; 60/253; 428/36.9; 428/36.3

*Primary Examiner*—Charles T. Jordan
*Assistant Examiner*—Michael Carone
*Attorney, Agent, or Firm*—Anthony T. Lane; Edward Goldberg; Michael C. Sachs

[57] ABSTRACT

A rocket motor casing comprises a tube made of helically wound and cured graphite/epoxy resin. A plurality of circumferentially spaced axially extending slits are cut into the graphite/epoxy structure which is subsequently covered by an aramid fiber/rubberized resin system which is hoop wrapped around the outer surface of the graphite/epoxy structure. During gun launching, the motor casing is capable of withstanding inwardly directed circumferential forces which tend to reduce the size of the slits and buckle and bend the aramid fiber/rubberized resin system. This system is capable of withstanding such deformation without failure. After launch the rocket motor is fired which requires the casing to act as a pressure vessel to withstand the outwardly directed forces from the rocket motor. These forces are withstood by the strength of the aramid fiber/rubberized resin system. Sufficient axial strength is provided by the cured and helical wound graphite/epoxy structure.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SLITTED HYBRID COMPOSITE DESIGN FOR GUN LAUNCH APPLICATIONS

STATEMENT OF GOVERNMENT INTEREST

The Government may use this invention for government purposes without payment to the inventor of any royalties thereon. The Government has rights in this invention pursuant to contract No. DAAK-10-84-C-0293, awarded by the Department of the Army.

FIELD AND BACKGROUND OF THE INVENTION

The present invention relates in general to gun-launched rocket motors, and in particular to a new and useful composite casing for such rocket motors.

The cases of gun-launched rocket motors must be capable of withstanding both external pressures, when the rocket is being launched from the gun, and internal pressures when the rocket motor is fired after it has left the gun.

Previous thin-walled rocket motors have failed due to circumferential compression during gun launching.

SUMMARY OF THE INVENTION

An object of the present invention is to provide a thin-walled composite rocket motor casing which satisfies the various conditions that are required for a gun-lanuched rocket motor. These include axial strength to carry the excessive axial acceleration loads to which the casing is subjected during gun launching and thereafter when the rocket motor is fired. The casing must also have sufficient circumferential softness to prevent failure to excessively high external pressure loads. Further, the motor casing must function as a pressure vessel after it has been launched.

To satisfy these requirements, the present invention forms the rocket motor casing from a tube of helically wound and cured graphite/epoxy. A plurality of circumferentially spaced substantially axially extending slots are thereafter cut into the graphite/epoxy structure. This effectively uncouples the transfer of circumferential stress around the casing wall during launch. To provide sufficient circumferential strength in the motor casing so that it can act as a pressure vessel when the motor is subsequently fired, the slotted tube is circumferentially wrapped with a strong somewhat resilient structure, preferably aramid fiber with a rubberized resin system.

The number and width of the slots cut into the graphite/epoxy structure is determined on the basis of the external pressure condition to which the motor casing is subjected during gun launching. Composite helical "beams" are formed between the slots and deflect radially inwardly to a point where the beams almost touch, but do not actually touch.

Using aramid fiber/rubberized resin for the external hoop wraps is necessary so that on loading from external pressure, the material can deform and buckle without damage, despite the inward deflection of the graphite/epoxy beams. This deflection must be accommodated by a material which does not fail from circumferential stresses. The aramid fibre is used because of its ability to bend and buckle without failure. This is contrasted to graphite or glass fibers which are brittle and cannot accommodate such bending. This allows the aramid fiber to subsequently carry a tinsile load which is required during the motor firing stage, following launch. The rubberized resin is used so that a minimum of load is transferred to the aramid fiber during the external pressure loading, and so it to does not fail when deflected.

DESCRIPTION OF THE PREFERRED EMBODIMENT

Figure 4:
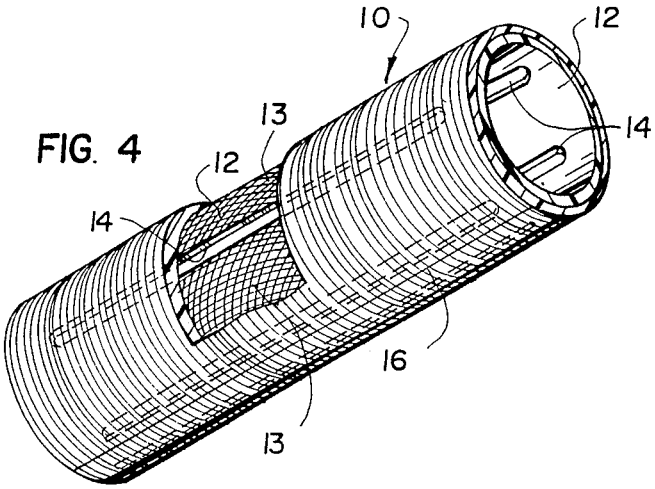
FIG. 4 is a partial perspective view of a tube used to form a motor casing in accordance with the present invention, with portions cut away to show underline structures.

Referring the drawings in particular, the invention embodied in FIG. 4 comprises a motor casing tube 10 having a hybrid composite which includes an inner helically wound and cured graphite/epoxy structure 12 having a plurality of circumferentially spaced and axially extending slits 14 therein. Structure 12 is hoop wrapped by an aramid fiber plus rubberized resin system 16 which covers the outer surface of structure 12 and its slits 14.

Figure 1:
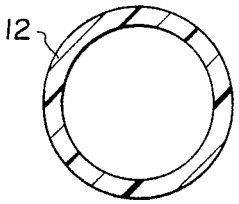
FIG. 1 is sectional view showing the first stage of manufacture for the motor casing of the present invention.

As shown in FIG. 1, an initial step in manufacturing the rocket motor casing 10 is to helically wind and cure a graphite/epoxy structure to form the cylindrical structure 12.

Figure 2:
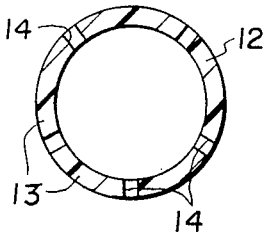
FIG. 2 is a view similar to FIG. 1 showing a second phase during manufacture of the motor casing.

FIG. 2 illustrates the second step which comprises the cutting of a plurality of circumferentially spaced substantially axially extending slits or slots 14 into the wall of the structure 12.

Figure 3:
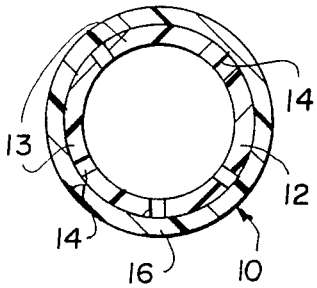
FIG. 3 is a view similar to FIG. 1 of a third and final stage of manufacture for the motor casing.

FIG. 3 illustrates the last step in the process whereby the hoop wrapped aramid fiber/rubberized resin covering 16 is applied over the outer surface of structure 12.

The hybrid composite structure of the invention provides sufficient circumferential resiliency and strength during the gun-launched phase to avoid any damage to the motor casing. Individual resin beams 13 which are defined between the slits 14, actually move toward each other when the tube is inwardly and circumferentially stressed during the gun launching phase. While the edges of the slits 14 never touch each other, the inward movement of the beams produces bending and buckling of the hoop structure 16 in the area of the slits. The aramid fiber/rubberized resin system is not damaged by this deformation however, and returns to its original position and strength after the rocket motor casing has left the gun. Upon the firing of the rocket motor, the casing is capable of acting as a pressure vessel and absorbing the outward forces through the hoop wrapped structure 16.

Sufficient axial strength is provided by the helically wound graphite/epoxy structure 12.

While a specific embodiment of the invention has been shown and described in detail to illustrate the application of the principles of the invention, it will be understood that the invention may be embodied otherwise without departing from such principles.

What is claimed is:

1. A rocket motor casing for a gun-launched rocket, comprising:

a helically wound and cured graphite/epoxy tubular structure having a plurality of circumferentially spaced substantially axially extending slits therein; and a hoop wrapped resilient fiber structure wrapped onto at least one surface of said tubular structure, which covers and spans said slits.

2. A rocket motor casing according to claim 1, wherein said hoop wrapped structure comprises an aramid fiber/rubberized resin composite.

3. A rocket motor casing according to claim 2, wherein said hoop wrapped structure is positioned on an outer surface of said tubular structure.

4. A rocket motor casing according to claim 1, wherein said hoop wrapped structure is positioned on an outer surface of said tubular structure.

5. A rocket motor casing according to claim 1, including five circumferentially spaced slits in said tubular structure.

6. A rocket motor casing according to claim 1, wherein said tubular and hoop wrapped structures are cylindrical, said slits extending axially.

* * * * *